United States Patent [19]
Briot

[11] 3,711,144
[45] Jan. 16, 1973

[54] GRAB FOR FUEL ELEMENTS OF A NUCLEAR REACTOR

[75] Inventor: Paul-Marie Henri Briot, Le Plessis Robinson, France

[73] Assignee: Groupement Atomique Alsacienne Atlantique (G.A.A.A.), Le Plessis Robinson, France

[22] Filed: Nov. 13, 1970

[21] Appl. No.: 89,242

[52] U.S. Cl. .................. 294/86 A, 294/88, 176/31
[51] Int. Cl. ............................................. B66c 1/44
[58] Field of Search.....294/86 A, 88, 97, 93; 176/12, 176/15, 30, 31

[56] References Cited

UNITED STATES PATENTS 3,253,853   5/1966   Loyer et al. ............................. 294/88

FOREIGN PATENTS OR APPLICATIONS 732,079   4/1966   Canada............................. 294/86 A Primary Examiner—Evon C. Blunk
Assistant Examiner—Johnny D. Cherry
Attorney—Cameron, Kerkam & Sutton

[57] ABSTRACT

An electric grab for handling fuel elements in a nuclear reactor through which a coolant gas is circulated in the direction of introduction of the grab, each grab jaw being associated with a streamlined cowling which surrounds the jaw over the greater part of its length and has a curvature which is determined by experiment. The cowling is rigidly fixed on the one hand to the lower portion of the grab body and on the other hand to lateral guiding uprights of the grab.

2 Claims, 1 Drawing Figure

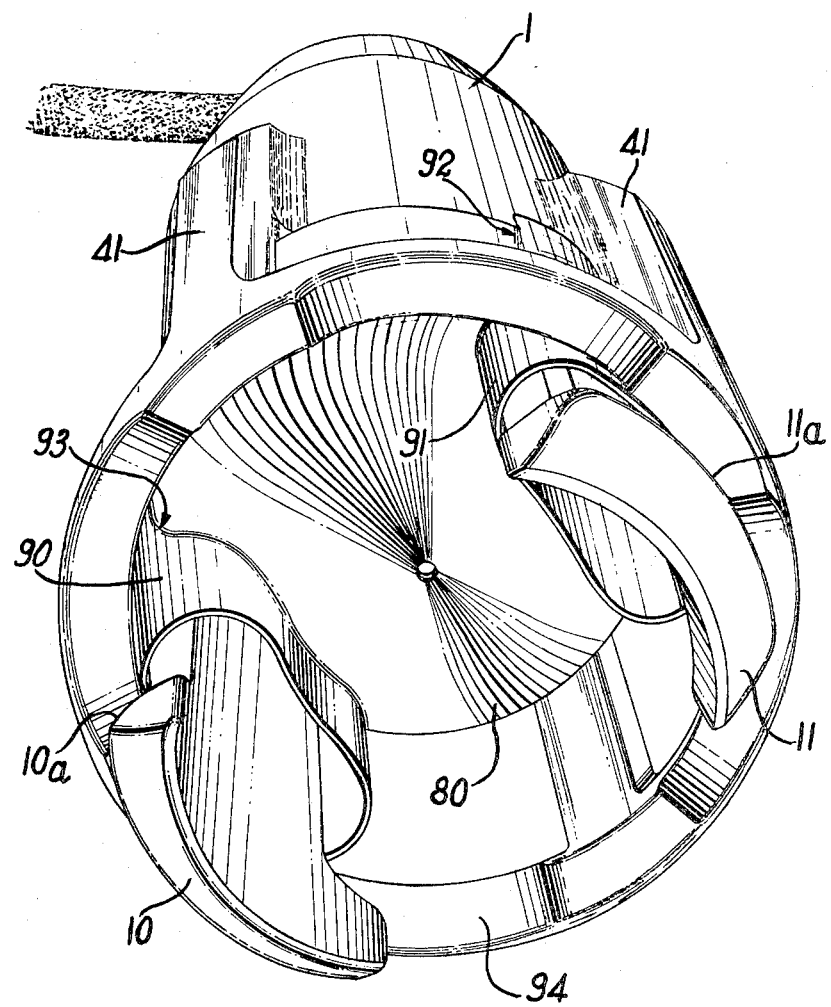

GRAB FOR FUEL ELEMENTS OF A NUCLEAR REACTOR

This invention relates to a jaw-type electric grab of the type described in U.S. Pat. Nos. 3,253,853 and 3,471,194 and relates to improvements made in said grab in order to ensure better operation under particular conditions of use, especially for handling fuel elements in a nuclear reactor which is cooled by circulation of a gas under pressure and even more particularly when the coolant gas flows in the direction in which the grab is introduced into the reactor and which is usually from the top downwards.

Under such conditions of operation, practical difficulties are found to arise in the opening or closing movements of the grab jaws and these latter also prove to be the source of vibrational movements. These phenomena occur only above a critical velocity of circulation of the coolant gas within the reactor channels and make it difficult if not impossible to ensure correct handling of fuel elements.

A systematic study of these aerodynamic phenomena points to the existence of two negative pressure zones in the vicinity of the grab. The first zone is located between the jaws beneath the grab body and results from an end-wall effect on the base of this latter. The second zone is located on the external portion of the jaws in the vicinity of the retaining noses provided at the jaw extremities, thereby resulting in breakaway of the boundary later within the gas flow. The first negative pressure zone can lead in particular to jamming of the jaws, thus making it impossible to carry out the opening movement which corresponds to outward displacement of the jaws. Moreover, the grab is subject to vibrations resulting from vortices which arise under the combined action of the negative pressure beneath the grab body and of breakaway of the boundary layer on the external ridges of the grab jaws.

This invention is concerned with improvements which are intended to eliminate the phenomena which are thus encountered under the specified operating conditions by associating with the grab jaws a means which makes it possible on the one hand to prevent jamming of said jaws by isolating them from the flowing gas stream over the greater part of their surface and on the other hand to prevent vibrational phenomena without thereby introducing prohibitive pressure drops on the path of the coolant gas.

In accordance with the invention, a cowling having a streamlined shape and a curvature which is determined by experiment is associated with each gripping jaw of the grab, said cowling being intended to surround the grab jaws over the greater part of their length and being rigidly fixed on the one hand to the lower portion of the grab body and on the other hand to lateral guiding uprights of said grab.

As an advantageous feature, the lower portion of the grab body is constituted by a hemispherical dome having an outwardly directed convexity. Moreover, and in accordance with another characteristic feature, the cowling which is associated with each grab jaw is formed of a completely closed sheet metal component which surrounds the jaw with a substantial clearance and has an open extremity in order to permit mounting of said cowling on the grab body. Finally, in order to ensure protection of the jaw cowlings particularly against impacts which are liable to arise during handling of fuel elements, the grab is advantageously provided with a circular guard ring which surrounds the jaws externally and is rigidly fixed to the extremities of the lateral guiding uprights.

The complementary description which follows below and is given by way of non-limitative example illustrates one embodiment of the electric fuel-element grab as endowed with the improvement in accordance with the present Addition, reference being made to the single FIGURE of the accompanying drawings which provides a perspective view of said grab.

In this FIGURE, there is shown a grab body 1 provided laterally with guide ribs or uprights 41 and with two grappling jaws 10 and 11, said jaws being placed on each side of the grab body and provided respectively with two outwardly directed noses 10a and 11a. The grab as illustrated is designed especially for handling fuel elements within a nuclear reactor in a stream of downwardly circulating coolant gas, namely of gas which flows in the direction of downward motion of the grab.

In order to reduce the effects of breakaway of boundary layers and vibrational phenomena in the coolant gas flow, the lower portion of the grab body is provided with a base constituted by a hemispherical dome 80, the convexity of which is directed outwards and the design function of which is to retard the breakaway of the boundary layer, thereby reducing the wake resistance and turbulence of the downstream flow. In addition, the jaws 10 and 11 are each associated with a hood 90 and 91 which forms a cowling and surrounds said jaws over the greater part of their length externally of the grab body 1. Said cowlings are formed of sheet metal and especially sheet steel, the curvature of the external profile of said cowlings being determined experimentally in order to obtain the best aerodynamic effect. In order that provision should also be made for mounting and attachment to the grab body 1, the cowlings 90 and 91 have an open top portion 92 which is welded to the external surface of the grab body 1 and this latter is joined to the portion surrounding the jaws by means of an enlarged portion 93, the profile of which is obtained especially by hammering.

As an advantageous feature, the cowlings 90 and 91 are rigidly fixed to the lateral guiding uprights 41. In addition, said uprights are preferably joined to a guard ring 94 which surrounds the sheet metal cowlings 90 and 91 externally so as to protect these latter against impacts during handling operations. Said guard ring also permits application of the grab against the top edge of a fuel element which is to be gripped by the jaws 10 and 11 while thus facilitating the positioning of said grab.

As will be readily understood, this invention is not limited in any sense to the example as hereinabove described but extends to all alternative forms.

I claim:

1. A grab for fuel elements of a nuclear reactor through which a coolant gas is circulated in the direction of introduction of the grab comprising a grab body, lateral guiding uprights for said body, grab jaws on said grab body, a cowling for each of said grab jaws, said cowling having a curved streamlined shape, said cowling surrounding the adjacent one of said grab jaws over the greater part of its length and rigidly secured to the lower portion of said grab body and to said lateral guiding uprights, the lower portion of said grab body including a hemispherical dome having an outwardly directed convexity, said cowling being a completely closed sheet metal component surrounding the adjacent one of said jaws with substantial clearance and an open extremity for said component for mounting said cowling on said grab body.

2. An electric grab in accordance with claim 1 including a circular guard ring outside said jaws rigidly fixed to the extremities of said lateral guiding uprights.

* * * * *